March 20, 1956  P. ANGENIEUX  2,738,702
PROJECTION CONTROL DEVICE FOR PROJECTIONISTS
Filed Aug. 24, 1951  4 Sheets-Sheet 1
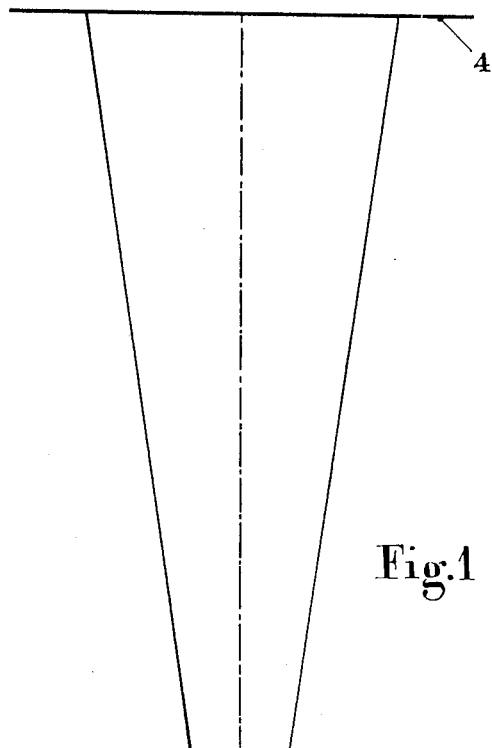
Fig.1
Fig.1a
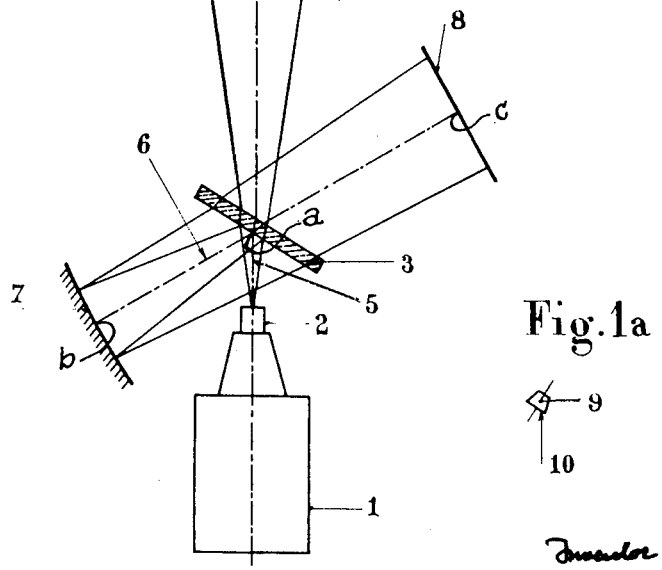
Inventor
Pierre Angenieux

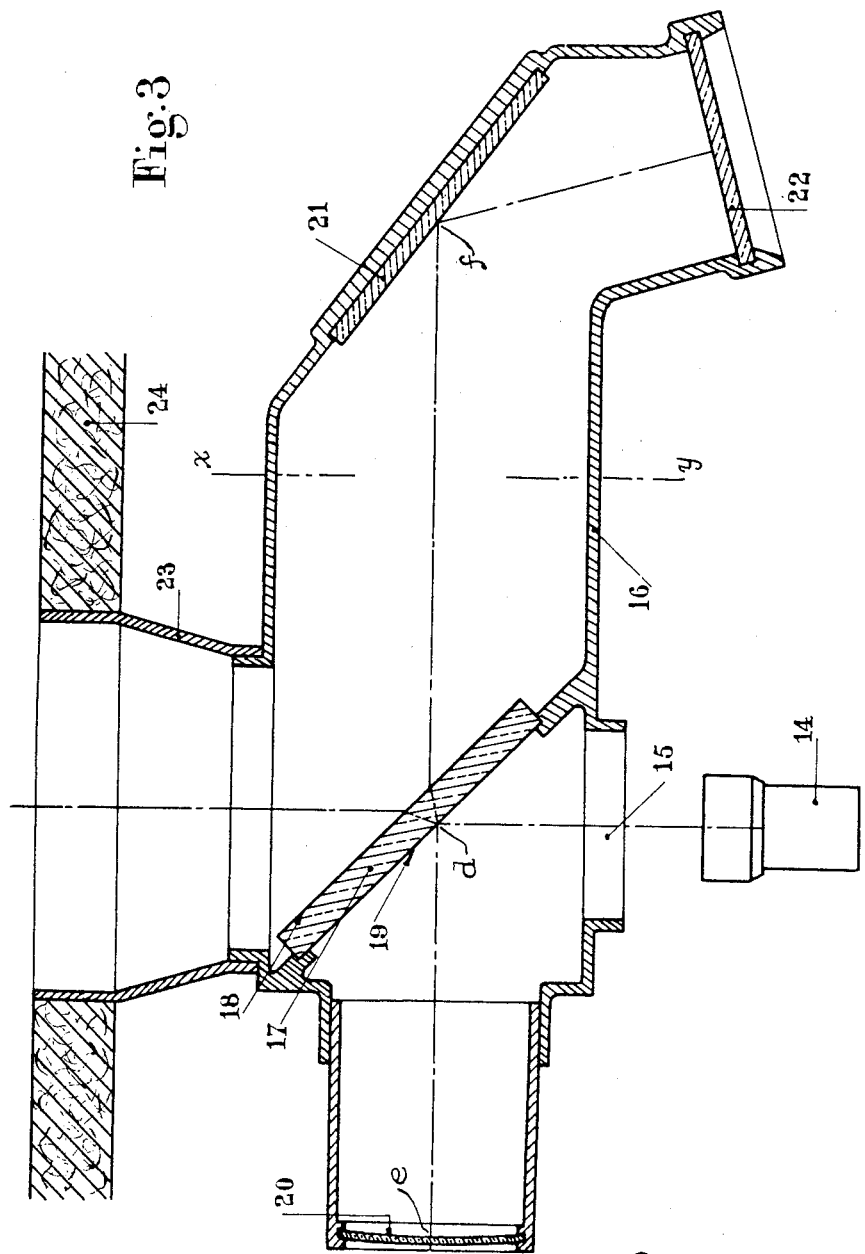

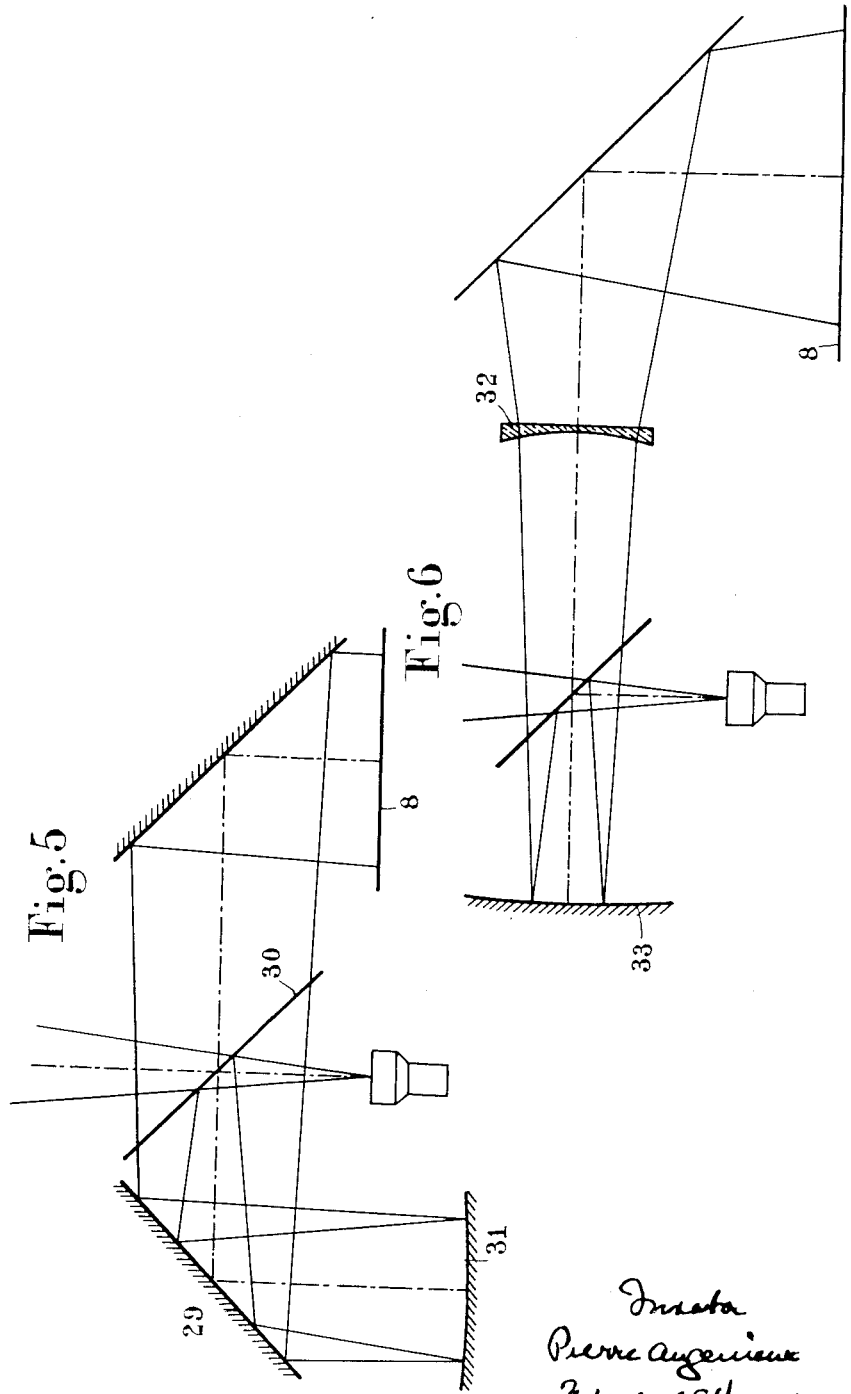

Patented Mar. 20, 1956

2,738,702

PROJECTION CONTROL DEVICE FOR PROJECTIONISTS

Pierre Angenieux, Saint Heand, France

Application August 24, 1951, Serial No. 243,529

Claims priority, application France October 5, 1950

1 Claim. (Cl. 88—24)

This invention relates to motion-picture or other projection system and more particularly to a device used for enabling the projectionist to control the projection in progress.

It is the object of this invention to provide a projection control device adapted to be associated with a projection apparatus and using a small fraction of the light beam issuing from the projection lens in order to form a clear and correctly oriented secondary image in the vicinity of the projector, so that the projectionist may closely examine that image, even from inside the projection booth, so as readily to control the quality of the projection in progress.

It is an essential feature of this invention to use a device comprising a transparent glass plate having parallel faces and placed in front of the projection lens so as to form an angle with the axis thereof, whereby a major portion of the light beam issuing from the projector will pass through this glass plate while a minor portion of this beam will be deflected by the air-glass surfaces of this glass plate, in combination with a concave mirror (or with a dioptric device associated with a reflecting surface, this assembly constituting a centered optical system) the axis of which coincides substantially with that of the light beam deflected by the parallel-faced glass plate, the purpose of this mirror (ordioptric-catoptric system) being the formation of a real image adapted to be projected on a small screen disposed in the vicinity of the projectionist.

The affixed drawings forming part of this specification illustrate diagrammatically by way of example a few embodiments of the invention. In the drawings:

Fig. 1 is a diagrammatic sectional view along the axis of a first embodiment of the invention.

Fig. 1a is a side view in which an opaque reflecting element is substituted for the oblique transparent glass plate of Fig. 1.

Fig. 3 is an axial and diametral sectional view of a practical embodiment of the invention.

Figs. 4 and 5 are diagrammatical sectional views similar to those of Figs. 1 and 2, but comprising a plurality of plane reflecting surfaces interposed in the path of the deflected luminous beam, and Fig. 6 is a diagrammatical sectional view of a device optically similar to that illustrated in Fig. 3 but wherein a divergent lens is interposed in the return path of the reflected light beam.

Figure 2:
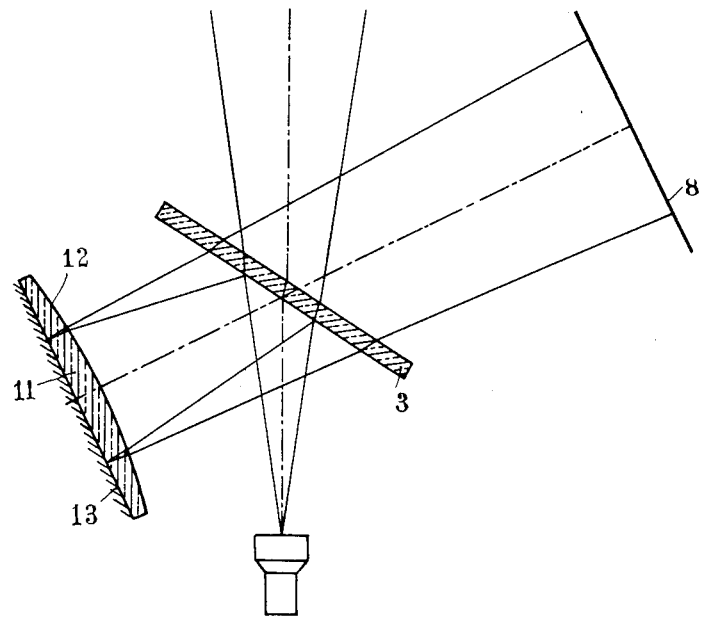
Fig. 2 illustrates a device similar to that of Fig. 1 except that a lens is substituted for the concave mirror.

Referring now to Fig. 1, 1 designates a projection lantern with its lens 2. In front of this lens is disposed a transparent glass plate 3 having parallel faces and through which the projection for the audience may take place on a screen 4. However, the plane surfaces which form the bounds of the glass plate reflect a small fraction of the luminous beam issuing from the projector and thus the axial light ray 5 is reflected in the direction of the axis 6 by the glass plate face which is nearest to the projector. In order to simplify the description no mention will be made of the reflection produced by the opposite face of this glass plate; besides, this other face may be coated with a non-reflecting layer in order to increase the quantity of light transmitted through the glass plate. At a suitable distance along the axis 6 a concave mirror 7 is centered in view of reflecting along the same axis 6 the aforesaid axial ray and forming, on a screen 8 positioned beyond the plane-surfaced glass plate in relation to the concave mirror, a clear and suitably oriented secondary image.

It will be noted that the provision of a non-reflecting layer on one of the air-glass surfaces of the glass plate is not compulsory in carrying out the present invention because if the absence of such a layer actually has the consequence of giving another secondary image, from a practical point of view both secondary images would be very close to each other provided that the projection screen for the auidience is positioned at a relatively great distance from the device and if the parallel-surfaced glass plate is relatively thin. Besides, if need be, it is still possible to use a glass plate with faces that are not absolutely parallel but form a very slight angle between each other in order to produce two superposed secondary images, the extremely low value of the prismatic effect produced by this glass plate having no appreciable influence on the quality of the image projected on the screen for the audience. Similarly, it is theoretically possible to dispense with this double image by focusing the projector lens for infinity and disposing, beyond the parallel-faced glass plate, a lens element having a focal length equal to the distance between this lens element and the projection screen, so that this lens element will only act upon the light beam intended for projecting the primary or performance image.

However, this modified embodiment of the invention is not very interesting, considering the dimensions of most motion-picture theatres.

It will be noted likewise that the transparent glass plate may be replaced with an opaque reflecting plane surface covering but a very small cross-sectional fraction of the light flux issuing from the projector lens whereby the greater part of this flux will illuminate the theatre screen directly, the secondary image resulting only from the flux portion shut out by the reflecting surface. Thus, considering the example of Fig. 1, the glass plate 3 may be replaced with a thin opaque plate which, when seen in plane view in this same figure, is idential with the glass plate 3 but, when seen in side view as at 9 in Fig. 1a, takes a trapezodial shape in order to shut out but the smallest possible portion of the beam to be projected on the screen for producing the primary image, the face 10 of this opaque plate being plane and reflective in view of forming the secondary image. One advantage of this arrangement is its low cost in comparison with the use of a parallel-faced glass plate, but it offers a drawback in that the secondary image obtained does not cover the entire field because it is cut across by a dark area corresponding to the shutting out of the return light beam from the concave mirror by this opaque plate.

The arrangement illustrated in Fig. 2 is similar to that of Fig. 1 except that the concave mirror 7 is replaced with a lens element 11 the front face 12 of which acts by refraction while its rear face 13 is a reflecting surface. The principle used is the same, the axis of this centered dioptric-catoptric system merging with the principal axis of the light beam which is to form the secondary image. Besides, it is obvious that, without departing from the spirit and scope of this invention, instead of using a single-element optical device for obtaining this dioptric-catoptric system, the latter may consist of two or more lens elements cemented or not with one another, having a positive or negative power, and that the reflecting surface may be concave, plane or convex and materially independent of the preceding refracting surface.

Therefore, the gist of the invention lies in the fact that in addition to the initial reflection required for taking a small fraction of the light flux in view of forming the secondary image, this light flux is acted upon by a reflecting surface, associated or not with a lens system, and constituting a centered system the axis of which is coincident with the axis of the beam reflected by the initial system. However, this centering may only be approximate for it is not necessarily extremely accurate and, notably in case a single concave mirror is used, these centering requirements may be substantially departed from without much interfering with the qualities of the image given by the mirror.

The embodiments illustrated in Figs. 1 and 2 can give correctly oriented secondary images. For this purpose, these images must be received on an opaque diffusing screen; when they are observed by transparency they are seen the wrong way up.

Fig. 3 illustrates a practical embodiment of the invention adapted to provide a correctly oriented secondary image adapted to be observed by transparency. Moreover, this embodiment is particularly suitable for use in a projection booth in which the projector is isolated from the audience, and an essential improvement of this arrangement is that it is designed to keep a fireproof separation between the theatre and the booth without having to introduce an additional glass panel for this purpose. In this figure the projection lens 14 is placed in front of an aperture 15 formed in a casing 16. This aperture is centered on the optical axis of the lens. Inside this casing and on the light beam issuing from the projector lens a transparent glass plate 17 having substantially parallel faces is disposed and the projection is effected through it on a motion-picture screen for the spectators, the rear face 18 of this plate being coated with a non-reflecting layer and the front face 19 thereof adapted to retransmit the light fraction reflected by this face towards a concave mirror 20 having its axis substantially coincident with that of the beam directed onto it. This beam is thus reflected in the incident direction and, after passing through glass plate 17, towards a plane mirror 21 which retransmits it so as to form a sharp, correctly oriented secondary image onto a translucent screen 22. The casing 16 is also formed with another aperture coaxial with aperture 15 and provided with a funnel-shaped-tubular member 23 that can be fitted in a sealed manner in an aperture provided for this purpose in the partition 24 separating the spectator room from the projection booth. Glass plate 17 and screen 22 are similarly placed in recesses provided for this purpose in the inner walls of casing 16 so as to ensure the sealed fitting of these optical components in the casing, whereby the booth will be wholly isolated from the theatre and the loss of light resulting from the use of this arrangement practically zero, in comparison with conventional booth-isolating arrangements.

From the point of view of optics alone this arrangement differs from the other devices described in the foregoing by the provision of an additional reflecting surface 21 whereby a correctly oriented image, visible by transparency, may be received in the booth and close to the projector.

Figure 4:
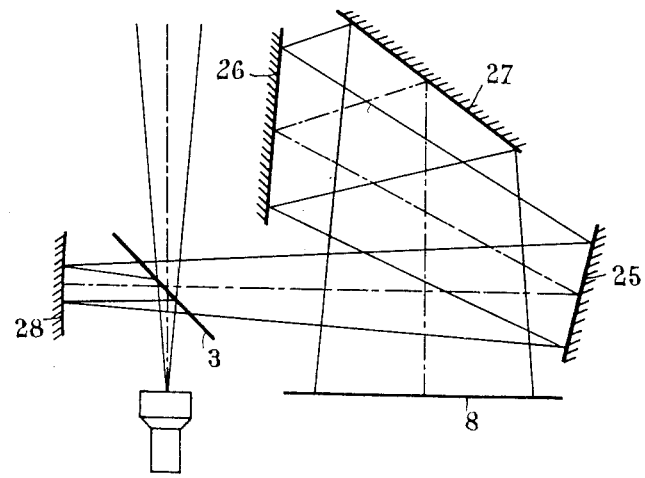

Referring now to Figs. 4 and 5, the embodiments illustrated comprise a plurality of reflecting surfaces, as already pointed out hereinabove. These surfaces will increase the optical length between the concave mirror and the secondary image screen in order to produce an image of greater size.

Fig. 4 illustrates a device comprising a set of three additional plane mirrors 25, 26, 27 arranged coaxially with the beam reflected from the concave mirror 28. It will be noted that by disposing an odd number of mirrors in the manner illustrated an image correctly oriented for vision by transparency will be obtained.

Fig. 5 shows a device comprising an additional mirror 29 disposed between the first reflecting surface 30, provided for the purpose of taking one fraction of the light flux issuing from the projector in view of forming the secondary image, and the concave mirror 31. With this arrangement the additional plane mirror acts twice: firstly, when the light beam is directed towards the concave mirror, and secondly when it is diverted therefrom. As a consequence, it exerts no influence on the orientation of the image but permits a substantial reduction in the lateral dimensions. In the optical space where this mirror is fitted it is therefore possible to introduce any desired number of plane mirrors without modifying the orientation of the image.

Finally, the following device illustrated in Fig. 6 is optically similar to that illustrated in Fig. 3 but differs therefrom in that a divergent lens element 32 is introduced in the light beam reflected by the concave mirror 33, this divergent lens element 32 constituting with this concave mirror 33 a centered optical system of the teleobjective type; thus, with this arrangement it is possible to obtain a secondary image of predetermined size and, to reduce the over-all dimensions of the complete device. It is obvious that the single divergent lens element illustrated in Fig. 6 may be replaced with two or more lenses, cemented or not, in view of improving the quality of the secondary image, if need be.

While I have herein shown and described a few forms in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claim.

What I claim is:

Projection control device adapted to be used in combination with the projection lens and comprising a translucent auxiliary screen situated in the projection booth and in the field of vision of the projectionist, and adapted to receive a secondary image of reduced dimensions in synchronism with the principal image formed on the projection screen, a system comprising three reflecting surfaces of which the first is disposed obliquely in relation to the projection lens axis and at a relatively short distance in front of said lens, said first reflecting surface being adapted to allow thereover the greater part of the light flux issuing from said projection lens in view of forming the image on said projection screen, and to deviate laterally by reflection the remaining part of said flux, whilst the second reflecting surface is disposed on the path of the light beam deviated by said first reflecting surface and at right angles to the axis of said light beam so that the axis of the light beam reflected by said second reflecting surface will coincide with the axis of the incident beam, said second reflecting surface being associated with an optical device adapted, after another deviation of the light beam produced by means of the third reflecting surface, to form a suitably oriented secondary image visible by transparency on said auxiliary screen, a casing adapted to be placed in front of the projection lens and mounted in an air-tight manner in the front partition of the projection booth, said casing being divided by an air-tight partition comprising said first reflecting surface into two compartments of which the one is formed with a rear aperture registering with said projection lens and has mounted laterally therein said second reflecting surface, the other compartment being formed at the front with an aperture opposite to said rear aperture and through which pass the light rays forming said principal image on said projection screen, said other compartment having mounted laterally said third reflecting surface and being formed at the rear with another aperture closed by said auxiliary screen.

References Cited in the file of this patent

UNITED STATES PATENTS

| | | |
|---|---|---|
| 1,397,346 | Wolff | Nov. 15, 1921 |
| 1,650,479 | Woodland | Nov. 22, 1927 |
| 1,931,668 | Mauerer | Oct. 24, 1933 |
| 1,938,992 | Baker et al. | Dec. 12, 1933 |
| 2,021,533 | Wolfe | Nov. 19, 1935 |
| 2,041,194 | Lindenberg | May 19, 1936 |
| 2,089,703 | May | Aug. 10, 1937 |
| 2,120,596 | Avery | June 14, 1938 |
| 2,358,316 | Chwalow | Sept. 19, 1944 |

FOREIGN PATENTS

| | | |
|---|---|---|
| 337,269 | Germany | May 27, 1921 |
| 344,431 | Germany | Nov. 21, 1921 |
| 485,111 | Germany | Oct. 26, 1929 |